US012725600B2

(12) United States Patent
Murata et al.

(10) Patent No.: US 12,725,600 B2
(45) Date of Patent: Sep. 1, 2026

(54) NOISE CANCELLING APPARATUS, NOISE CANCELLING METHOD, AND PROGRAM

(71) Applicant: NTT, Inc.

(72) Inventors: Shin Murata, Tokyo (JP); Yohei Wakisaka, Tokyo (JP); Noriyoshi Kamado, Tokyo (JP); Hiroaki Ito, Tokyo (JP)

(73) Assignee: NTT, Inc., Tokyo (JP)

( * ) Notice: Subject to any disclaimer, the term of this patent is extended or adjusted under 35 U.S.C. 154(b) by 115 days.

(21) Appl. No.: 18/719,434

(22) PCT Filed: Dec. 21, 2021

(86) PCT No.: PCT/JP2021/047310
§ 371 (c)(1),
(2) Date: Jun. 13, 2024

(87) PCT Pub. No.: WO2023/119416
PCT Pub. Date: Jun. 29, 2023

(65) Prior Publication Data
US 2025/0054480 A1 Feb. 13, 2025

(51) Int. Cl.
*G10K 11/178* (2006.01)

(52) U.S. Cl.
CPC .. *G10K 11/17823* (2018.01); *G10K 11/17825* (2018.01); *G10K 11/17881* (2018.01); *G10K 2210/3026* (2013.01); *G10K 2210/3027* (2013.01)

(58) Field of Classification Search
CPC ....... G10K 11/17823; G10K 11/17825; G10K 11/17881; G10K 2210/3026; G10K 2210/3027
USPC ........................................................ 381/71.8
See application file for complete search history.

(56) References Cited

U.S. PATENT DOCUMENTS

2012/0230504 A1* 9/2012 Kuroda ............ G10K 11/17857 381/71.4

FOREIGN PATENT DOCUMENTS

JP 2008158254 A 7/2008
WO 2011/030422 A1 2/2013

OTHER PUBLICATIONS

Yoshinobu Kajikawa (2015) "Recent Topics and Applications of Active Noise Control," IPSJ Research Report, vol. 2015-MUS-107, No. 3, pp. 1-6.

* cited by examiner

*Primary Examiner* — Vivian C Chin
*Assistant Examiner* — Douglas J Suthers

(57) ABSTRACT

A noise suppression technique which allows a user to recognize that a specific event occurs when the event that the user needs to be aware of occurs even during a process of suppressing noise around the user is provided. When the noise around the user includes a sound originating from a predetermined event (hereinafter referred to as "event sound"), a noise suppression device allows a user to recognize that the event occurs.

3 Claims, 5 Drawing Sheets

NOISE CANCELLING APPARATUS, NOISE CANCELLING METHOD, AND PROGRAM

CROSS-REFERENCE TO RELATED APPLICATIONS

This application is a U.S. 371 Application of International Patent Application No. PCT/JP2021/047310, filed on 21 Dec. 2021, the disclosure of which is hereby incorporated herein by reference in its entirety.

TECHNICAL FIELD

The present invention relates to an active noise control technique.

BACKGROUND ART

An active noise control technique is a technique which suppresses noise at specific locations such as a user's surroundings and is incorporated into vehicles, for example, to suppress sounds from the outside of the vehicle so that the user can hear desired sounds such as phone calls and music while in the vehicle. In active noise control techniques, systems which include a reference microphone which picks up noise, an error microphone which picks up sound at a user's position, a noise suppression device which generates an erasure sound signal for eliminating noise from a noise signal which is an output of the reference microphone and an error signal which is an output of the error microphone, and a loudspeaker which emits sound based on an erasure sound signal (hereafter referred to as "erasure sound") are commonly used (Refer to NPL 1). In this system, the operation of determining what kind of erasure sound needs to be emitted from the loudspeaker to suppress noise is repeatedly performed while measuring how much the noise picked up by the reference microphone is suppressed by an error microphone installed near the user.

CITATION LIST

Non Patent Literature

[NPL 1] Yoshinobu KAJIKAWA, "Recent Topics and Applications of Active Noise Control," IPSJ Research Report, Vol. 2015-MUS-107, No. 3, pp. 1-6, 2015.

SUMMARY OF INVENTION

Technical Problem

However, if the sound from the outside is fully cut off, an inconvenient situation may occur for the user. For example, if the siren of an emergency vehicle is also cut off while driving, a situation in which the driver cannot notice the approach of the emergency vehicle or is late in noticing it may arise. Thus, it is preferable to allow the user to be aware of sounds necessary to recognize the external situation rather than blocking out all external sounds.

Therefore, an object of the present invention is to provide a noise suppression technique which allows a user to recognize that an event has occurred when a specific event that the user needs to be aware of occurs even during the process of suppressing noise around the user.

Solution to Problem

An aspect of the present invention allows a user to recognize that an event has occurred when the noise around the user includes a sound originating from a predetermined event (hereinafter referred to as "event sound").

Advantageous Effects of Invention

According to the present invention, even during execution of processing for suppressing noise around the user, when a specific event that the user needs to recognize occurs, it is possible to make the user aware of the occurrence of the event.

DESCRIPTION OF EMBODIMENTS

Figure 1:
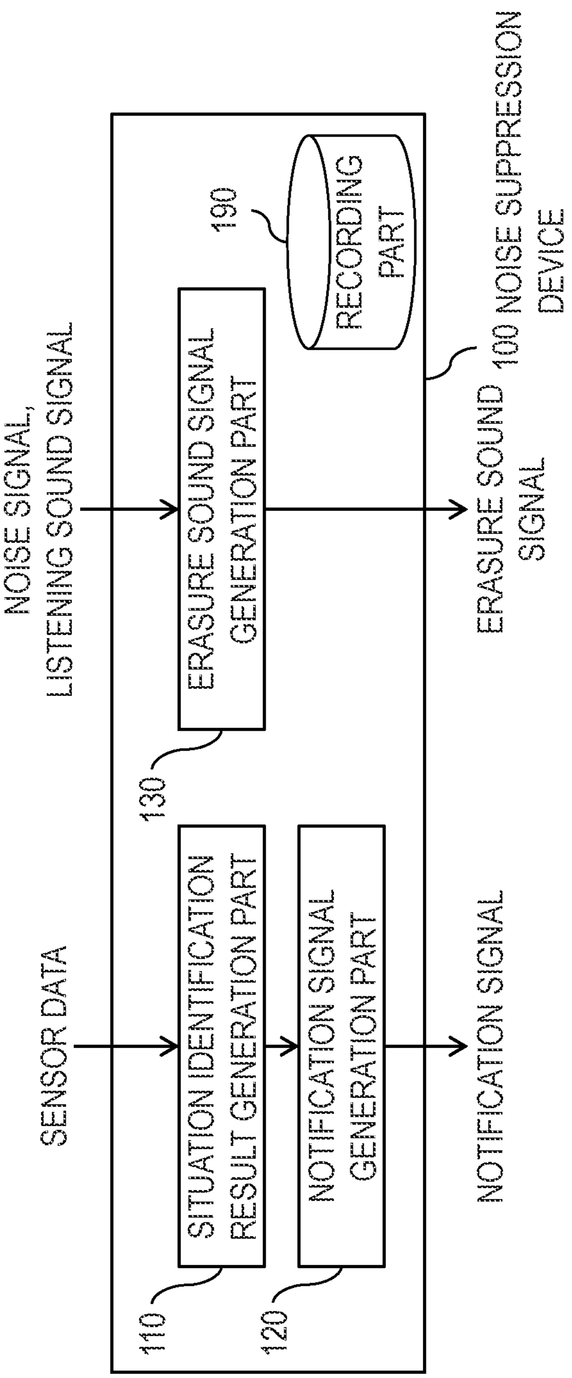
FIG. 1 is a block diagram showing a configuration of a noise suppression device 100.

Embodiments of the present invention will be described in detail below. Note that constituent elements having the same function will be denoted by the same reference numerals and redundant description thereof will be omitted.

First Embodiment

A noise suppression device 100 allows a user to recognize that an event has occurred when the noise around the user includes a sound originating from a predetermined event (hereinafter referred to as "event sound").

Figure 2:
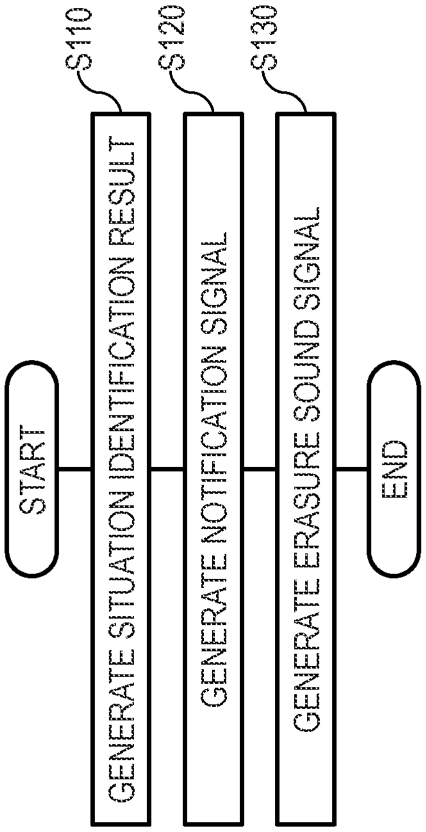
FIG. 2 is a flowchart for describing an operation of the noise suppression device 100.

The noise suppression device 100 will be described below with reference to FIGS. 1 and 2. FIG. 1 is a block diagram showing a configuration of the noise suppression device 100. FIG. 2 is a flowchart for describing an operation of the noise suppression device 100. As shown in FIG. 1, the noise suppression device 100 includes a situation identification result generation part 110, a notification signal generation part 120, an erasure sound signal generation part 130, and a recording part 190. The recording part 190 is a constituent element which appropriately records information necessary for processing of the noise suppression device 100.

The noise suppression device 100 is connected to one or more sensors (not shown) to acquire data used for identifying a situation around the user (hereinafter referred to as "sensor data"). For example, a microphone, a camera, or a vibration detection sensor can be used as the sensor. That is to say, the situation around the user is identified using the sounds, images, and vibrations around the user. Also, the noise suppression device 100 is connected to a situation presentation device (not shown) to make the user aware that an event has occurred. As the situation presentation device, for example, a loudspeaker, a display, or a mobile terminal such as a mobile phone or smartphone can be used. That is to say, the user is made to recognize that an event has occurred using sound, images, and vibrations.

The noise suppression device 100 is connected to one or more microphones (not shown, hereinafter referred to as "reference microphones") to capture the noise around the user and one or more microphones (not shown, hereinafter referred to as "error microphones") to acquire the sound heard by the user. Also, the noise suppression device 100 is connected to one or more loudspeakers (not shown) to emit a sound based on an erasure sound signal, that is, the erasure sound.

An operation of the noise suppression device 100 will be described according to FIG. 2.

In S110, the situation identification result generation part 110 receives sensor data obtained using a sensor and uses sensor data to generate and output a situation identification result that indicates whether an event is occurring around the user. For example, when the sensor data is a railroad crossing sound, the situation identification result generation part 110 uses an existing speech recognition technique to generate a situation identification result indicating to the user that a train is approaching the railroad crossing. Also, for example, when the sensor data is a video or image of a railroad crossing blocking, the situation identification result generation part 110 uses an existing image recognition technique to generate a situation identification result that indicates to the user that a train is approaching a railroad crossing. Furthermore, for example, when the vibration detection sensor detects sudden vibration, the situation identification result generation part 110 generates a situation identification result indicating to the user that there is a possibility of collision with an obstacle.

The situation identification result generation part 110 calculates, for example, a value indicating a degree of correlation between a reference sound for determining a sound originating from a predetermined event and noise around the user, generates a situation identification result indicating that an event has occurred around the user when the value is greater than a predetermined threshold value or the value is greater than or equal to the predetermined threshold value, and generates a situation identification result indicating that an event has not occurred around the user in other cases. Note that the reference sound may be recorded in the recording part 190 in advance.

In S120, the notification signal generation part 120 receives the situation identification result generated in S110, and generates and outputs a notification signal that notifies the user of the occurrence of an event when the situation identification result indicates that an event has occurred around the user. The situation presentation device receives the notification signal generated in S120 and presents the notification content to the user on the basis of the notification signal. When the situation presentation device is a loudspeaker, the notification signal is a notification sound signal which informs the user that an event occurs. Furthermore, when the situation presentation device is a display, the notification signal is a signal of a notification video which notifies the user that an event has occurred. When the situation presentation device is a mobile terminal, the notification signal is a notification vibration signal which notifies the user that an event has occurred.

In S130, the erasure sound signal generation part 130 receives, as inputs, the user's ambient noise signal obtained using one or more reference microphones and the user's listening sound signal obtained using one or more error microphones and generates an erasure sound signal for erasing noise from the noise signal and the listening sound signal and outputs it. The loudspeaker receives the erasure sound signal generated in S130 and emits sound based on the erasure sound signal.

Note that the erasure sound signal generation part 130 can also generate the erasure sound signal without using the noise signal. In this case, in S130, the erasure sound signal generation part 130 receives, as inputs, the user's listening sound signal acquired using one or more error microphones and generates and outputs an erasure sound signal for erasing noise from the listening sound signal.

According to an embodiment of the present invention, even during execution of processing for suppressing noise around the user, when a specific event that the user needs to recognize occurs, it is possible to make the user aware of the occurrence of the event.

Second Embodiment

A noise suppression device 200 allows a user to recognize that an event has occurred when the noise around the user includes a sound originating from a predetermined event (hereinafter referred to as "event sound").

Figure 3:
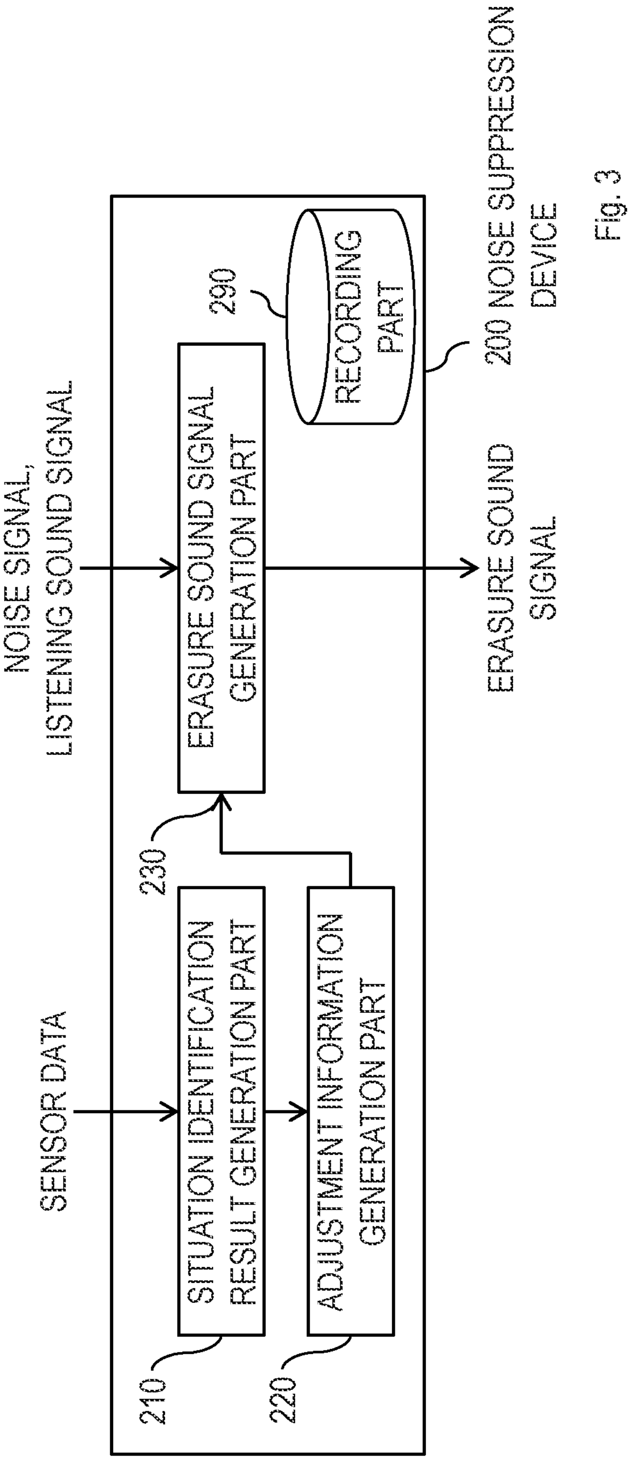
FIG. 3 is a block diagram showing a configuration of a noise suppression device 200.
Figure 4:
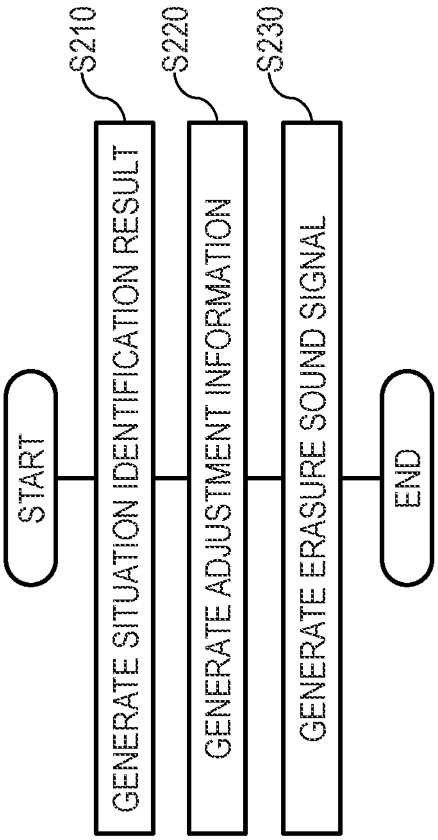
FIG. 4 is a flowchart for describing an operation of the noise suppression device 200.

The noise suppression device 200 will be described below with reference to FIGS. 3 and 4. FIG. 3 is a block diagram showing a configuration of the noise suppression device 200. FIG. 4 is a flowchart for describing an operation of the noise suppression device 200. As shown in FIG. 3, the noise suppression device 200 includes a situation identification result generation part 210, an adjustment information generation part 220, an erasure sound signal generation part 230, and a recording part 290. The recording part 290 is a constituent element which appropriately records information necessary for processing of the noise suppression device 200.

As in the noise suppression device 100, the noise suppression device 200 is connected to one or more sensors (not shown) to acquire data used for identifying a situation around the user (hereinafter referred to as "sensor data").

As in the noise suppression device 100, the noise suppression device 200 is connected to one or more microphones (not shown, hereinafter referred to as "reference microphones") to acquire the noise around the user and one or more microphones (not shown, hereinafter referred to as "error microphones") to acquire the user's listening sound. Furthermore, as in the noise suppression device 100, the noise suppression device 200 is connected to one or more loudspeakers (not shown) to emit a sound based on the erasure sound signal, that is, an erasure sound.

An operation of the noise suppression device 200 will be described with reference to FIG. 4.

In S210, the situation identification result generation part 210 receives sensor data obtained using a sensor and uses sensor data to generate and output a situation identification result that indicates the likelihood that an event occurs around the user. The value of the situation identification result may be a binary value of a value indicating that an event has occurred around the user and a value indicating that an event has not occurred and may be a value that indicates the degree of correlation between the reference sound for determining the sound originating from a predetermined event and the noise around the user. Note that the reference sound may be recorded in the recording part 290 in advance. When the value of the situation identification result is the above binary value, the situation identification result generation part 210 calculates, for example, a value indicating a degree of correlation between a reference sound for determining a sound originating from a predetermined event and noise around the user, generates a situation identification result indicating that an event occurs around the user when the value is greater than a predetermined threshold value or the value is greater than or equal to the predetermined threshold value, and generates a situation identification result indicating that an event does not occur around the user in other cases. Also, when the value of the situation identification result is a value that indicates a degree of correlation, the situation identification result generation part 210 calculates, for example, a value indicating a degree of correlation between a reference sound for determining a sound originating from a predetermined event and noise around the user and uses the value indicating the degree of correlation as the situation identification result.

In S220, the adjustment information generation part 220 receives the situation identification result generated in S210 and generates information (hereinafter referred to as "adjustment information") regarding the relative magnitude of the event sound erasure sound for erasing the event sound with respect to the erasure sound for erasing the noise determined in accordance with the value of the situation identification result. When the value of the situation identification result is a binary value indicating that an event has occurred around the user and a value that indicates that it has not occurred, the adjustment information generation part 220 generates, as adjustment information, information indicating that the event sound erasure sound needs to be excluded from the erasure sounds when the value of the situation identification result is a value indicating that an event occurs around the user. Also, when the value of the situation identification result is a value indicating a degree of correlation between the reference sound for determining the sound originating from a predetermined event and the noise around the user, the adjustment information generation part 220 generates, as adjustment information, information indicating that the greater the value of the situation identification result, the greater the proportion of excluding the event sound erasure sound from the erasure sound.

For example, when the sensor data is a video or an image for determining whether the railroad crossing is blocked, the situation identification result generation part 210 uses an existing image recognition technique to generate a situation identification result that is a binary value of a value indicating to the user that a train is approaching the railroad crossing and a value indicating to the user that the train is not approaching the railroad crossing. When the situation identification result is a value that indicates to the user that a train is approaching the railroad crossing, the adjustment information generation part 220 generates a sound for erasing a sound in a specific frequency band corresponding to the railroad crossing sound as an event sound erasure sound and generates, as adjustment information, information indicating that the event sound erasure sound needs to be excluded from the erasure sound.

In S230, the erasure sound signal generation part 230 receives, as inputs, the user's ambient noise signal acquired using one or more reference microphones, the user's listening sound signal acquired using one or more error microphones, and the adjustment information generated in S220 and generates and outputs an erasure sound signal for erasing noise from the noise signal, the listening sound signal, and the adjustment information. The loudspeaker receives the erasure sound signal generated in S230 and emits sound based on the erasure sound signal.

Note that the erasure sound signal generation part 230 can also generate the erasure sound signal without using the noise signal. In this case, in S230, the erasure sound signal generation part 230 receives, as inputs, the user's listening sound signal obtained using one or more error microphones and the adjustment information generated in S220 and generates and outputs an erasure sound signal for erasing noise from the listening sound signal and the adjustment information.

According to an embodiment of the present invention, even during execution of processing for suppressing noise around the user, when a specific event that the user needs to recognize occurs, it is possible to make the user aware of the occurrence of the event.

Additional Note

Figure 5:
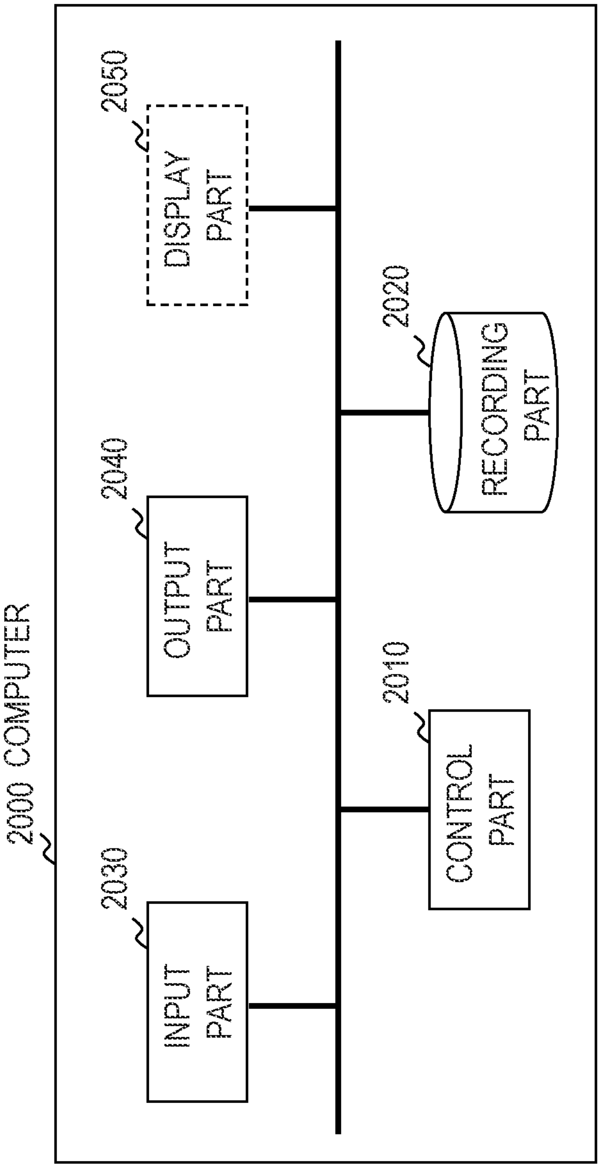
FIG. 5 is a diagram illustrating an example of a functional configuration of a computer which implements each device according to an embodiment of the present invention.

FIG. 5 is a diagram showing an example of a functional configuration of a computer 2000 which implements each device described above. The processing in each device described above can be performed by causing the recording part 2020 to read a program for causing the computer 2000 to function as each device described above and causing a control part 2010, an input part 2030, an output part 2040, a display part 2050 (optional), and the like to operate.

The device of the present invention includes, for example, as a single hardware entity, an input part to which a keyboard or the like can be connected, an output part to which a liquid crystal display can be connected, a communication part to which a communicable communication device (for example, a communication cable) can be connected to the outside of the hardware entity, a CPU (Central Processing Unit: which may include a cache memory, a register, and the like), a RAM and a ROM which are memories, an external storage device such as a hard disk, and a bus which connects these input parts, output parts, communication parts, CPU, RAM, ROM, and external storage devices so that data can be exchanged. Also, if necessary, the hardware entity may include a device (drive) capable of reading and writing a recording medium such as a CD-ROM. A physical entity with such hardware resources includes a general purpose computer.

The external storage device of the hardware entity stores programs necessary for realizing the functions described above, data necessary for processing the programs, and the like (not limited to the external storage device, for example, the program may be stored in a ROM which is a read-only storage device). In addition, the data obtained by the processing of these programs are appropriately stored in a RAM, an external storage device, or the like.

In the hardware entity, each program stored in an external storage device (or a ROM or the like) and the data necessary for processing each program are read into a memory as needed, and interpreted, executed, and processed by the CPU as appropriate. As a result, the CPU realizes a predetermined function (each constituent element represented by the above, . . . part, . . . means, and the like).

The present invention is not limited to the above-described embodiments, and can be modified as appropriate without departing from the scope of the present invention. Furthermore, the processes described in the above embodiments are not only executed in chronological order according to the described order, but may also be executed in parallel or individually according to the processing capacity of the device which executes the processes or as necessary.

As described above, when the processing functions of the hardware entity (devices of the present invention) described in the above embodiments are implemented by a computer, the processing contents of the functions that the hardware entity needs to have are described by a program. The processing functions of the hardware entity are realized on the computer by executing this program on a computer.

A program describing the contents of this processing can be recorded in a computer-readable recording medium. Any computer-readable recording medium may be used, for example, a magnetic recording device, an optical disk, a magneto-optical recording medium, a semiconductor memory, or the like. Specifically, for example, as magnetic recording devices, a hard disk device, a flexible disk, a magnetic tape, and the like can be used, as optical discs, a DVD (Digital Versatile Disc), a DVD-RAM (Random Access Memory), a CD-ROM (Compact Disc Read Only Memory), a CD-R (Recordable)/RW (ReWritable), and the like can be used, as magneto-optical recording media, an MO (Magneto-Optical disc), and the like can be used, and as semiconductor memories, an EEP-ROM (Electronically Erasable and Programmable-Read Only Memory) and the like can be used.

Also, distribution of this program is carried out by selling, assigning, lending, etc. portable recording media such as DVDs and CD-ROMs on which the program is recorded, for example. Furthermore, the program may be distributed by storing the program in the storage device of the server computer and transferring the program from the server computer to other computers via the network.

A computer which executes such a program, for example, first stores the program recorded on a portable recording medium or the program transferred from the server computer once in an own storage device thereof. When executing the process, this computer reads the program stored in an own storage device thereof and executes the process according to the read program. Furthermore, as another execution form of this program, the computer may directly read the program from a portable recording medium and execute processing according to the program. In addition, each time the program is transferred from the server computer to this computer, the process according to the received program may be sequentially executed. In addition, the above processing is executed by a so-called ASP (Application Service Provider) type service which does not transfer the program from the server computer to this computer and realizes the processing function only by the execution instruction and result acquisition. Note that the program in this embodiment includes information to be used for processing by a computer and equivalent to a program (data that is not a direct command to the computer but has the property of prescribing the processing of the computer or the like).

Moreover, in this embodiment, the hardware entity is configured by executing a predetermined program on the computer, but at least part of these processing contents may be implemented by hardware.

The foregoing descriptions of embodiments of the invention have been presented for purposes of illustration and description. It is not intended to be exhaustive or to limit the invention to the precise forms disclosed. Modifications and variations are possible in light of the above teachings. The embodiments have been chosen and expressed to provide the best illustration of the principles of the invention and to enable those skilled in the art to utilize the present invention in various embodiments and with various modifications as suitable for the practical use contemplated. All such modifications and variations are within the scope of the present invention as defined by the appended claims, construed in accordance with their breadth which is fairly and legally afforded.

The invention claimed is:

1. A noise suppression device, in which, when noise around a user includes an event sound originating from a predetermined event, the user is made aware that the predetermined event occurs, comprising:

a situation identification result generation circuitry which generates a situation identification result indicating the likelihood that the predetermined event occurs around the user from sensor data acquired using a sensor;

an adjustment information generation circuitry which generates adjustment information regarding a relative magnitude of an event sound erasure sound for erasing the event sound with respect to an erasure sound for erasing the noise determined in accordance with the value of the situation identification result; and an erasure sound signal generation circuitry which generates an erasure sound signal for erasing the noise from a user's listening sound signal acquired using one or more microphones and the adjustment information, wherein a value of the situation identification result is a value indicating a degree of correlation between the noise and a reference sound for determining the event sound originating from the predetermined event, and the adjustment information is information indicating that a proportion of excluding the event sound erasure sound from the erasure sound increases as the value of the situation identification result increases.

2. A non-transitory computer-readable storage medium which stores a program for causing a computer to function as the noise suppression device according to claim 1.

3. A noise suppression method, in which, when noise around a user includes an event sound originating from a predetermined event, the user is made aware that the predetermined event occurs, comprising:

generating a situation identification result indicating the likelihood that the predetermined event occurs around the user from sensor data acquired using a sensor;

generating adjustment information regarding a relative magnitude of an event sound erasure sound for erasing the event sound with respect to an erasure sound for erasing the noise determined in accordance with the value of the situation identification result; and generating an erasure sound signal for erasing the noise from a user's listening sound signal acquired using one or more microphones and the adjustment information, wherein a value of the situation identification result is a value indicating a degree of correlation between the noise and a reference sound for determining the event sound originating from the predetermined event, and the adjustment information is information indicating that a proportion of excluding the event sound erasure sound from the erasure sound increases as the value of the situation identification result increases.

* * * * *